US008236892B2

(12) United States Patent
Luo et al.

(10) Patent No.: US 8,236,892 B2
(45) Date of Patent: Aug. 7, 2012

(54) FUNCTIONALIZED POLYMER AND METHODS FOR MAKING AND USING

(76) Inventors: Steven Luo, Copley, OH (US); Yoichi Ozawa, Kodaira (JP); Jason Poulton, Akron, OH (US); Dennis R Brumbaugh, North Canton, OH (US); Michael W. Hayes, Canton, OH (US)

( * ) Notice: Subject to any disclaimer, the term of this patent is extended or adjusted under 35 U.S.C. 154(b) by 182 days.

(21) Appl. No.: 12/810,845

(22) PCT Filed: Dec. 26, 2008

(86) PCT No.: PCT/US2008/088366
§ 371 (c)(1),
(2), (4) Date: Jul. 21, 2010

(87) PCT Pub. No.: WO2009/086477
PCT Pub. Date: Jul. 9, 2009

(65) Prior Publication Data
US 2010/0311899 A1    Dec. 9, 2010

Related U.S. Application Data

(60) Provisional application No. 61/017,481, filed on Dec. 28, 2007, provisional application No. 61/044,769, filed on Apr. 14, 2008.

(51) Int. Cl.
*C08F 8/28* (2006.01)
(52) U.S. Cl. ......................................................... 525/55
(58) Field of Classification Search ...................... 525/55
See application file for complete search history.

(56) References Cited

U.S. PATENT DOCUMENTS

| | | | |
|---|---|---|---|
| 3,109,871 A | 11/1963 | Zelinski et al. |
| 3,135,716 A | 6/1964 | Uraneck et al. |
| 4,015,061 A | 3/1977 | Schulz et al. |
| 4,519,431 A | 5/1985 | Yoshimura et al. |
| 4,540,744 A | 9/1985 | Oshima et al. |
| 4,550,142 A | 10/1985 | Akita et al. |
| 4,603,722 A | 8/1986 | Oshima et al. |
| 4,616,069 A | 10/1986 | Watanabe et al. |
| 4,647,625 A | 3/1987 | Aonuma et al. |
| 4,677,165 A | 6/1987 | Kikucki et al. |
| 4,906,706 A | 3/1990 | Hattori et al. |
| 4,929,679 A | 5/1990 | Akita et al. |
| 4,990,573 A | 2/1991 | Andreussi et al. |
| 5,064,910 A | 11/1991 | Hattori et al. |
| 5,109,907 A | 5/1992 | Stayer, Jr. et al. |
| 5,115,035 A | 5/1992 | Shiraki et al. |
| 5,210,145 A | 5/1993 | Lawson et al. |
| 5,219,942 A | 6/1993 | Suzuki et al. |
| 5,227,431 A | 7/1993 | Lawson et al. |
| 5,248,722 A | 9/1993 | DeTrano et al. |
| 5,329,005 A | 7/1994 | Lawson et al. |
| 5,332,810 A | 7/1994 | Lawson et al. |
| 5,349,024 A | 9/1994 | Hergenrother et al. |
| 5,502,129 A | 3/1996 | Hergenrother et al. |
| 5,552,473 A | 9/1996 | Lawson et al. |
| 5,567,784 A | 10/1996 | Wieder et al. |
| 5,786,441 A | 7/1998 | Lawson et al. |
| 5,844,050 A | 12/1998 | Fukahori et al. |
| 5,877,336 A | 3/1999 | Hergenrother et al. |
| 5,902,856 A | 5/1999 | Suzuki et al. |
| 5,916,976 A | 6/1999 | Kerns et al. |
| 5,935,893 A | 8/1999 | Lawson et al. |
| 6,596,798 B1 | 7/2003 | Rademacher et al. |
| 6,759,497 B2 | 7/2004 | Grün et al. |
| 6,977,281 B1 | 12/2005 | Ozawa et al. |
| 6,992,147 B1 | 1/2006 | Ozawa et al. |
| 2007/0078232 A1 | 4/2007 | Yan |
| 2007/0185267 A1 | 8/2007 | Kobayashi et al. |
| 2010/0317818 A1 | 12/2010 | Hogan et al. |
| 2011/0077325 A1 | 3/2011 | Luo |

FOREIGN PATENT DOCUMENTS

JP     2007-154014 A     6/2007

OTHER PUBLICATIONS

Int'l Search Report from int'l appl. No. PCT/US2008/088366—3 pp.
Written Opinion from int'l appl. No. PCT/US2008/088366—3 pp.
Extended Search Report from EP appl. No. 08867443.7—5 pp.

*Primary Examiner* — Kuo-Liang Peng
(74) *Attorney, Agent, or Firm* — Meredith E. Hooker; David Burleson

(57) ABSTRACT

A functionalized polymer includes a polymer chain and a terminal functionality that includes at least one disilylamino group. The polymer can be the reaction product of a terminally active polymer chain and a compound that includes at least one disilylamino group and a group capable of reacting with terminally active polymers. Methods for making and using such polymers also are provided, as are compositions containing the polymer and one or more types of filler particles as well as vulcanizates provided from such compositions.

17 Claims, No Drawings

FUNCTIONALIZED POLYMER AND METHODS FOR MAKING AND USING

CROSS-REFERENCE TO RELATED APPLICATIONS

This is a national stage entry application of international application no. PCT/US2008/088366, filed 26 Dec. 2008, and claims the benefit of U.S. provisional appl. Nos. 61/017,481 filed 28 Dec. 2007 and 61/044,769 filed 14 Apr. 2008.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook,* 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. Unfortunately, treads made from compositions designed to provide good road traction typically exhibit increased rolling resistance.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, for example, tire components. In addition to natural rubber, some of the most commonly employed include high-cis polydienes, often made by processes employing catalysts, and styrene/butadiene interpolymers, often made by processes employing anionic initiators. Functionalities that can be incorporated into high-cis polydienes often cannot be incorporated into anionically initiated styrene/butadiene interpolymers and vice versa.

Cis-1,4-polydienes produced with lanthanide-based catalysts often have a linear structure, which is believed to provide improved tensile properties, improved abrasion and fatigue resistance, and reductions in hysteresis loss. Such cis-1,4-polydienes thus are particularly suitable for use in tire components such as sidewalls and treads.

SUMMARY

In one aspect is provided a polymer having terminal moiety that includes a disilylamino group. The terminal moiety can be the radical of compound that includes a group that includes at least one heteroatom in addition to the disilylamino group(s). In certain embodiments, the terminal moiety can have the formula

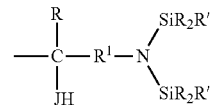

where each R independently is a hydrogen atom or a substituted or unsubstituted mono-valent organic (e.g., a hydrocarbyl) group; $R^1$ is a substituted or unsubstituted divalent organic group such as, but not limited to, hydrocarbylene groups; J is O or S; and each R' independently is R or both R' groups together form a substituted or unsubstituted divalent organic group which, together with the two Si atoms and N atom of the disilylamino group, constitute a cyclic functionality.

In another aspect is provided a functionalized polymer that includes the reaction product of a terminally active (e.g., carbanionic or pseudo-living) polymer chain and a compound that includes both a disilylamino group and a group that can react with terminally active polymers such as, for example, a (thio)keto or epoxy (or S analog, i.e., epithio) group. Methods useful in making this type of functional polymer also are provided. In certain embodiments, the compound that reacts with the polymer (also referred to herein as "reactive compound") can have a structure defined by the following formula

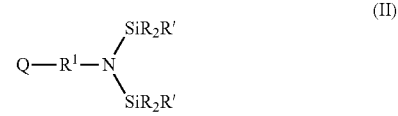

where R, R' and $R^1$ are defined as above and Q is a heteroatom-containing group that can react with terminally active polymers; in certain embodiments, Q can have either of the following formulas

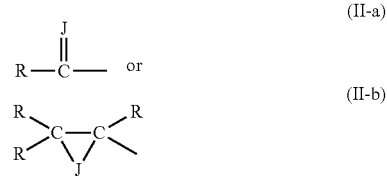

where R and J are defined as above.

In a further aspect is provided a macromolecule defined by the following formula

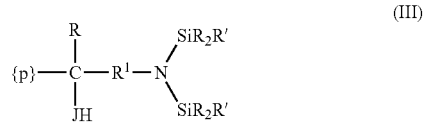

where {p} represents a polymer chain and R, R', $R^1$, and J are defined as above.

Regardless of how characterized, the polymer can interact with particulate filler such as, for example, carbon black and silica. Compositions, including vulcanizates, that include particulate fillers and such polymers also are provided, as are methods of providing and using such compositions.

In any or each of these aspects, the polymer can include directly bonded aromatic pendent groups, can be substantially linear, and/or can include unsaturation within and/or pendent from the polymer chain. This unsaturation can result from incorporation of polyene mer units and preferably is substantially random along the polymer chain.

Other aspects of the invention will be apparent to the ordinarily skilled artisan from the description of illustrative embodiments that follows. To assist in understanding that description, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"macromolecule" means a chemical that includes within its structure two or more polymeric chains;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"(thio)keto" means keto or thioketo;

"substituted" means containing a heteroatom or functionality (e.g., hydrocarbyl group) that does not interfere with the intended purpose of the group in question;

"directly bonded" means covalently attached with no intervening or interposed atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means that portion of a molecule which remains after reacting with another molecule, regardless of whether any atoms are gained or lost as a result of the reaction;

"non-coordinating anion" means a sterically bulky anion that does not form coordinate bonds with, for example, the active center of a catalyst system due to steric hindrance;

"non-coordinating anion precursor" means a compound that is able to form a non-coordinating anion under reaction conditions;

"terminus" means an end of a polymeric chain; and

"terminal moiety" means a group or functionality located at a terminus.

Throughout this document, all values given in the form of percentages are weight percentages unless the surrounding text explicitly indicates a contrary intention.

DETAILED DESCRIPTION

The functionalized macromolecular materials summarized above can be provided by introducing at least one compound that includes at least one disilylamino group and a group capable of reacting with terminally active polymers (hereinafter "functionalizing agent"). The molar ratio of functionalizing agent(s) to polymer chains can be adjusted to control the amount of functionalized polymers, although an excess of functionalizing agent(s) typically is employed so as to achieve complete or very nearly complete functionalization.

The polymer can be elastomeric and can include mer units that include unsaturation such as those derived from polyenes, particularly dienes and trienes. Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Depending on the intended end use, one or more of the polymer chains can include pendent aromatic groups which can be provided, for example, through incorporation of vinyl aromatic mer, particularly $C_8$-$C_{20}$ vinyl aromatics such as styrene, a-methyl styrene, p-methyl styrene, the vinyl toluenes, the vinyl naphthalenes, and the like. When used in conjunction with one or more polyenes, mer units with pendent aromaticity can constitute from ~1 to ~50%, from ~10 to ~45%, or from ~20 to ~35%, based on total mer content, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to ~65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be substantially linear. For certain end use applications, keeping the content of 1,2-linkages even lower, e.g., to less than about 7%, less than 5%, less than 2%, or less than 1%, can be desirable.

The number average molecular weight ($M_n$) of the polymer typically is such that a quenched sample exhibits a gum Mooney viscosity ($ML_4$/100° C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, anionically initiated (living) polymerizations are described first, followed by a description of coordination catalyst (pseudo-living) polymerizations. After these descriptions, the functionalization and processing of polymers so made are discussed.

Solution polymerization typically involves an initiator. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyllithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, for example, the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligoalkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for ease of reference. The following is based on a batch process, although extending this description to, semi-batch, continuous, etc., processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to 150,000 Daltons.

Certain end use applications call for polymers that have properties that can be difficult or inefficient to achieve via anionic (living) polymerizations. For example, in some applications, conjugated diene polymers having high cis-1,4-linkage contents can be desirable. Polydienes can be prepared by processes using catalysts (as opposed to the initiators employed in living polymerizations) and may display pseudo-living characteristics.

Some catalyst systems preferentially result in cis-1,4-polydienes, while others preferentially provide trans-1,4-polydienes. The ordinarily skilled artisan is familiar with examples of each type of system. The remainder of this description is based on a particular cis-specific catalyst system, although this merely is for sake of exemplification and is not considered to be limiting to the functionalizing method and compounds.

Exemplary coordination catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes.

Preferred lanthanide-based catalyst compositions are described in detail in, for example, U.S. Pat. No. 6,699,813 and patent documents cited therein. The term "catalyst composition" is intended to encompass a simple mixture of ingredients, a complex of various ingredients that is caused by physical or chemical forces of attraction, a chemical reaction product of some or all of the ingredients, or a combination of the foregoing. A condensed description is provided here for convenience and ease of reference.

Exemplary lanthanide catalyst compositions include (a) a lanthanide compound, an alkylating agent and a halogen-containing compound (although use of a halogen-containing compound is optional when the lanthanide compound and/or the alkylating agent contains a halogen atom); (b) a lanthanide compound and an aluminoxane; or (c) a lanthanide compound, an alkylating agent, and a non-coordinating anion or precursor thereof.

Various lanthanide compounds or mixtures thereof can be employed. These compounds preferably are soluble in hydrocarbon solvents such as aromatic hydrocarbons, e.g., benzene, toluene, xylenes, (di)ethylbenzene, mesitylene, and the like; aliphatic hydrocarbons such as linear and branched $C_5$-$C_{10}$ alkanes, petroleum ether, kerosene, petroleum spirits, and the like; or cycloaliphatic hydrocarbons such as cyclopentane, cyclohexane, methylcyclopentane, methylcyclohexane, and the like; although hydrocarbon-insoluble lanthanide compounds can be suspended in the polymerization medium. Preferred lanthanide compounds include those which include at least one Nd, La, or Sm atom or those including didymium (a commercial mixture of rare-earth elements obtained from monazite sand). The lanthanide atom(s) in the lanthanide compounds can be in any of a number of oxidation states, although compounds having a lanthanide atom in the +3 oxidation state typically are employed. Exemplary lanthanide compounds include carboxylates, organophosphates, organophosphonates, organophosphinates, xanthates, carbamates, dithiocarbamates, β-diketonates, alkoxides, aryloxides, halides, pseudo-halides, oxyhalides, and the like; numerous examples of each of these types of lanthanide compounds can be found in the aforementioned U.S. Pat. No. 6,699,813.

Typically, the lanthanide compound is used in conjunction with one or more alkylating agents, i.e., organometallic compounds that can transfer hydrocarbyl groups to another metal. Typically, these agents are organometallic compounds of electropositive metals such as Groups 1, 2, and 3 metals. Exemplary alkylating agents include organoaluminum compounds and organomagnesium compounds. The former include (1) compounds having the general formula $AlR^2_n X_{3-n}$ where n is an integer of from 1 to 3 inclusive, each $R^2$ independently is a monovalent organic group (which may contain heteroatoms such as N, O, B, Si, S, P, and the like) connected to the Al atom via a C atom and each X independently is a hydrogen atom, a halogen atom, a carboxylate group, an alkoxide group, or an aryloxide group; and (2) oligomeric linear or cyclic aluminoxanes, which can be made by reacting trihydrocarbylaluminum compounds with water. The latter include compounds having the general formula $MgR^3_y X_{2-y}$ where X is defined as above, y is an integer of from 1 to 2 inclusive, and $R^3$ is the same as $R^2$ except that each monovalent organic group is connected to the Mg atom via a C atom.

Some catalyst compositions can contain compounds with one or more labile halogen atoms. Preferably, the halogen-containing compounds are soluble in hydrocarbon solvents such as those described above with respect to lanthanide compounds, although hydrocarbon-insoluble compounds can be suspended in the polymerization medium. Useful halogen-containing compounds include elemental halogens, mixed halogens, hydrogen halides, organic halides, inorganic halides, metallic halides, organometallic halides, and mixtures of any two or more of the foregoing.

Other catalyst compositions contain a non-coordinating anion or a non-coordinating anion precursor. Exemplary non-coordinating anions include tetraarylborate anions, particularly fluorinated tetraarylborate anions, and ionic compounds containing non-coordinating anions and a countercation (e.g., triphenylcarbonium tetrakis(pentafluorophenyl)borate). Exemplary non-coordinating anion precursors include boron compounds that include strong electron-withdrawing groups.

Catalyst compositions of the type just described have very high catalytic activity for polymerizing conjugated dienes into stereospecific polydienes over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for each ingredient can depend on the concentrations of the other ingredients. The following molar ratios are considered to be relatively exemplary for a variety of different systems based on the foregoing ingredients:

alkylating agent to lanthanide compound (alkylating agent/Ln): from ~1:1 to ~200:1, preferably ~2:1 to ~100:1, more preferably ~5:1 to ~50:1;

halogen-containing compound to lanthanide compound (halogen atom/Ln): from ~1:2 to ~20:1, preferably ~1:1 to ~10:1, more preferably ~2:1 to ~6:1;

aluminoxane to lanthanide compound, specifically equivalents of aluminum atoms on the aluminoxane to equivalents of lanthanide atoms in the lanthanide compound (Al/Ln): from ~50:1 to ~50,000:1, preferably ~75:1 to ~30,000:1, more preferably ~100:1 to ~1000:1; and non-coordinating anion or precursor to lanthanide compound (An/Ln): from ~1:2 to ~20:1, preferably ~3:4 to ~10:1, more preferably ~1:1 to ~6:1.

The molecular weight of polydienes produced with lanthanide-based catalysts can be controlled by adjusting the amount of catalyst used and/or the amounts of co-catalyst concentrations within the catalyst system; polydienes having a wide range of molecular weights can be produced in this manner. In general, increasing the catalyst and co-catalyst concentrations reduces the molecular weight of resulting polydienes, although very low molecular weight polydienes (e.g., liquid polydienes) require extremely high catalyst concentrations.

Including one or more Ni-containing compounds to lanthanide-based catalyst compositions advantageously permits easy regulation of the molecular weight of the resulting polydiene without significant negative effects on catalyst activity and polymer microstructure. Various Ni-containing compounds or mixtures thereof can be employed. The Ni-containing compounds preferably are soluble in hydrocarbon solvents such as those set forth above, although hydrocarbon-insoluble Ni-containing compounds can be suspended in the polymerization medium to form the catalytically active species.

The Ni atom in the Ni-containing compounds can be in any of a number of oxidation states including the 0, +2, +3, and +4 oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudo-halides, oxyhalides, organonickel compounds (i.e., compounds containing at least one C—Ni bond such as, for example, nickelocene, decamethylnickelocene, etc.), and the like.

The molar ratio of the Ni-containing compound to the lanthanide compound (Ni/Ln) generally ranges from ~1:1000 to ~1:1, preferably from ~1:200 to ~1:2, and more preferably from ~1:100 to ~1:5.

These types of catalyst compositions can be formed using any of the following methods:

(1) In situ. The catalyst ingredients are added to a solution containing monomer and solvent (or simply bulk monomer). The addition can occur in a stepwise or simultaneous manner. In the case of the latter, the alkylating agent preferably is added first followed by, in order, the lanthanide compound, the nickel-containing compound (if used), and (if used) the halogen-containing compound or the non-coordinating anion or non-coordinating anion precursor.

(2) Pre-mixed. The ingredients can be mixed outside the polymerization system, generally at a temperature of from about −20° to about 80° C., before being introduced to the conjugated diene monomer(s).

(3) Pre-formed in the presence of monomer(s). The catalyst ingredients are mixed in the presence of a small amount of conjugated diene monomer(s) at a temperature of from about −20° to about 80° C. The amount of conjugated diene monomer can range from ~1 to ~500 moles, preferably from ~5 to ~250 moles, and more preferably from ~10 to ~100 moles, per mole of the lanthanide compound. The resulting catalyst composition is added to the remainder of the conjugated diene monomer(s) to be polymerized.

(4) Two-stage procedure.
(a) The alkylating agent is combined with the lanthanide compound in the absence of conjugated diene monomer, or in the presence of a small amount of conjugated diene monomer, at a temperature of from about −20° to about 80° C.

(b) The foregoing mixture and the remaining components are charged in either a stepwise or simultaneous manner to the remainder of the conjugated diene monomer(s) to be polymerized.

(The Ni-containing compound, if used, can be included in either stage.)

When a solution of one or more of the catalyst ingredients is prepared outside the polymerization system in the foregoing methods, an organic solvent or carrier is preferably employed. Useful organic solvents include those mentioned previously.

The production of cis-1,4-polydiene is accomplished by polymerizing conjugated diene monomer(s) in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.05 to ~0.5 mmol per 100 g conjugated diene monomer. All other ingredients generally are added in amounts that are based on the amount of lanthanide compound (see the various ratios set forth previously).

Polymerization preferably is carried out in an organic solvent, i.e., as a solution or precipitation polymerization where the monomer is in a condensed phase. The catalyst ingredients preferably are solubilized or suspended within the organic liquid. The amount of monomer (wt. %) present in the polymerization medium at the beginning of the polymerization generally ranges from ~3 to ~80%, preferably ~5 to ~50%, and more preferably ~10% to ~30%. (Polymerization also can be carried out by means of bulk polymerization conducted either in a condensed liquid phase or in a gas phase.)

Regardless of whether a batch, continuous, or semi-continuous process is employed, the polymerization preferably is conducted with moderate to vigorous agitation under anaerobic conditions provided by an inert protective gas such as $N_2$, Ar or He. The polymerization temperature may vary widely, although typically a temperature of from ~20° to ~90° C. is employed; heat can be removed by external cooling and/or cooling by evaporation of the monomer or the solvent. The polymerization pressure employed may vary widely, although typically a pressure of from about 0.1 to about 1 MPa is employed.

Where 1,3-butadiene is polymerized, the cis-1,4-polybutadiene generally has a $M_n$, as determined by GPC using polystyrene standards, of from 5,000 to 200,000 Daltons, from 25,000 to 150,000 Daltons, or from 50,000 to 120,000 Daltons. The polydispersity of the polymers generally ranges from ~1.5 to ~5.0, typically ~2.0 to ~4.0.

Resulting polydienes advantageously can have a cis-1,4-linkage content of at least ~60%, at least about ~75%, at least about ~90%, and even at least about ~95%, and a 1,2-linkage content of less than ~7%, less than ~5%, less than ~2%, and even less than ~1%, both based on the total amount of incorporated diene.

Both of the described polymerization processes advantageously result in polymer chains that possess active (living or pseudo-living) terminals, which can be further reacted with one or more functionalizing agents so as to provide functionalized polymers. As described above, functionalization can enhance the interaction between the polymer and particulate fillers in rubber compounds, thereby improving the mechanical and dynamic properties of the resulting vulcanizates.

The functionalizing agent generally includes a disilylamino group and a heteroatom-containing group or functionality capable of reacting with terminally active polymers; non-limiting examples of such groups include (thio)isocyanate, (thio)aldehyde, imine, amide, trihydrocarbyl isocyanurates, (thio)carboxylic acid esters and salts thereof, carboxylic acid anhydrides and acid halides, dihydrocarbyl esters of carbonic acid, (thio)keto, epoxy and epithio groups. Specific examples of certain of these compounds include those shown above in formula (II) in which each R' independently can be R or, alternatively, both R' groups together can form a substituted or unsubstituted divalent organic group which, together with the two Si atoms and N atom of the disilylamino group, constitute a cyclic functionality; the second of these possibilities can be represented by the following structure:

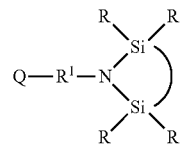

(IV)

Preferred compounds defined by formula (II) include those where Q is defined as in formula (II-a) with J being O. Within this group, a preferred subset includes those compounds where $R^1$ is a phenylene group. Specific examples of this preferred subset of compounds includes N,N-bis(trimethylsilyl)-2-aminobenzophenone, N,N-bis(trimethylsilyl)-3-aminobenzophenone, N,N-bis(trimethylsilyl)-4-aminobenzophenone (abbreviated BTMSAB below), N,N-bis(trimethylsilyl)-2-aminoacetophenone, N,N-bis(trimethylsilyl)-3-aminoacetophenone, N,N-bis(trimethylsilyl)-4-aminoacetophenone, N,N-bis(trimethylsilyl)-2-aminobenzaldehyde, N,N-bis(trimethylsilyl)-1-aminoanthraquinone, N,N-bis(trimethylsilyl)-2-aminoanthraquinone, N,N-bis(trimethylsilyl)-6-aminoflavone, N,N-bis(trimethylsilyl)-7-aminoflavone, N,N-bis(trimethylsilyl)-1-amino-9-fluorenone, N,N-bis(trimethylsilyl)-2-amino-9-fluorenone, N,N-bis(trimethylsilyl)-3-amino-9-fluorenone, N,N-bis(trimethylsilyl)-4-amino-9-fluorenone, N,N-bis(trimethylsilyl)-3-aminocoumarin, N,N-bis(trimethylsilyl)-7-amino-2-methylchromone, N,N-bis(trimethylsilyl)-7-amino-4-methylcoumarin, N,N,N',N'-tetrakis(trimethylsilyl)-1,2-diaminoanthraquinone, N,N,N',N'-tetrakis(trimethylsilyl)-1,4-diaminoanthraquinone, N,N,N',N'-tetrakis(trimethylsilyl)-1,5-diaminoanthraquinone, N,N,N',N'-tetrakis(trimethylsilyl)-2,6-diaminoanthraquinone, N,N,N',N'-tetrakis(trimethylsilyl)-1,3-diaminoacetone, N,N,N',N'-tetrakis(trimethylsilyl)-2,2'-diaminobenzophenone (abbreviated TTMSDAB below), N,N,N',N'-tetrakis(trimethylsilyl)-3,3'-diaminobenzophenone, N,N,N',N'-tetrakis(trimethylsilyl)-4,4'-diaminobenzophenone, N,N,N',N'-tetrakis(trimethylsilyl)-2,3-diaminobenzophenone, N,N,N',N'-tetrakis(trimethylsilyl)-2,4-diaminobenzophenone, N,N,N,'N'-tetrakis(trimethylsilyl)-3,4-diaminobenzophenone, N,N, N',N'-tetrakis(trimethylsilyl)-2,7-diamino-9-fluorenone, N,N,N',N'-tetrakis(trimethylsilyl)-1,4-diaminoanthraquinone, N,N,N',N'-tetrakis(trimethylsilyl)-1,8-diaminoanthraquinone, and N,N,N',N'-tetrakis(trimethylsilyl)-1,4-diaminoanthraquinone.

Other preferred compounds defined by formula (II) include those where Q is defined as in formula (II-b) with J being O. Within this group, a preferred subset includes those compounds where $R^1$ is a $C_1$-$C_6$ alkylene group. A specific example of this preferred subset of compounds is N,N-bis(trimethylsilyl)glycidylamine (abbreviated BTMSGA below).

Reaction of such functionalizing agent(s) with terminally reactive polymers can be performed relatively quickly (a few minutes to a few hours) by simple mixing at moderate temperatures (e.g., 0° to 75° C.). Generally, from ~0.01 to ~200 moles, preferably from ~0.1 to ~150 moles, and more preferably from ~0.25 to ~75 moles of functionalizing agent(s) per mole of lanthanide compound are employed. If desired, the functionalization reaction can be performed in the polymerization vessel.

This functionalization reaction can result in a macromolecule having a structure defined by formula (III), which also can be described as the reaction product of a polymer, particularly a carbanionic or pseudo-living polymer, and a compound that includes a disilylamino group and at least one functionality that can react with or add to a reactive polymer terminus. Non-limiting examples of functionalities capable of reacting with a reactive polymer terminus include (thio)keto, epoxy and epithio groups. In certain embodiments, the compound also can contain one, two or even more aromatic (e.g., phenyl) groups and, in certain of these embodiments, each of the aromatic groups can have at least one N atom bonded to one of its ring C atoms; in certain preferred embodiments, each N atom is silylated with a group that contains a $C_1$-$C_6$ alkyl chain. In other embodiments, the epoxy or epithio functionality can be attached to the disilylamino group through a $C_1$-$C_6$ alkylene group. Compounds of the type just described can be defined generally according to the structure set forth in formula (II).

After the functionalization reaction, a quenching agent can be added to the polymer cement to inactivate any residual reactive polymer chains and the catalyst composition. The quenching agent may be one or more protic compounds such as, for example, alcohols, carboxylic acids, inorganic acids, water, and the like. An antioxidant may be added before, with, or after the quenching agent. The amount of the antioxidant employed can range from ~0.2 to ~1% by weight of the polymer product.

Functionalized polymer can be isolated from the polymerization mixture by conventional techniques such as drum drying, extruder drying, vacuum drying or the like, which may be combined with coagulation with water, alcohol or steam. If coagulation is performed, oven drying may be desirable.

Functionalized polymers can display particularly advantageous properties when compounded with, inter alia, reinforcing fillers such as carbon black and silica. They can be utilized in a sidewall or tread stock compound or can be blended with any conventionally employed tread stock rubber including natural rubber and/or non-functionalized synthetic rubbers such as, for example, one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2$/g, preferably at least about 35 $m^2$/g, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica ($SiO_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 $m^2$/g, commonly from ~32 to ~400 $m^2$/g or from ~100 to ~250 $m^2$/g or from ~150 to ~220 $m^2$/g.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of about 1 to about 100 phr, preferably in an amount from about 5 to about 80 phr. When used with carbon black, the amount of silica can be decreased to as low as about 1 phr; as the amount of silica decreases, lesser amounts of the processing aids, plus silane if any, can be employed.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be used. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The following non-limiting, illustrative examples provide the reader with detailed conditions and materials that can be useful in the practice of the present invention.

EXAMPLES

Example 1

TTMSDAB

About 5.1 g 4,4'-diaminobenzophenone, 10.7 g triethylamine, and 10 mL toluene were mixed in a round-bottom reaction flask cooled in an ice bath. To this mixture was added, in dropwise fashion, a solution of 23.5 g trimethylsilyl trifluoromethanesulfonate in 50 mL toluene.

The resulting mixture was stirred at room temperature for 2 days before the toluene and unreacted reagents were removed under vacuum. The residue was extracted with 100 mL hexane. Evaporating the hexane layer under vacuum at 40° C. yielded ~11.0 g (92% yield) of a yellow solid.

From $^1$H NMR spectroscopy data ($C_6D_6$, 25° C., referenced to tetramethylsilane), the structure of the product was confirmed to be

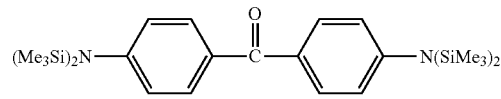

which corresponds to the structure from formula (II) above with each R and R' being a methyl group, $R^1$ being a phenylene group, and Q being represented by formula (II-a) with J being O and R being a disilylamino group-substituted phenylene group.

Example 2

BTMSAB

About 12.0 g 4-aminobenzophenone, 13.5 g triethylamine, and 15 mL toluene (15 mL) were mixed in a round-bottom reaction flask cooled in an ice bath. To this mixture was added, in dropwise fashion, a solution of 29.7 g trimethylsilyl trifluoromethanesulfonate in 50 mL toluene.

The resulting mixture was stirred at room temperature for 2 days before the toluene and unreacted reagents were removed under vacuum. The residue was extracted with 100 mL cyclohexane. Evaporating the hexane layer under vacuum at 50° C. yielded ~19.3 g (93% yield) of a viscous brownish yellow liquid.

From $^1$H NMR spectroscopy data ($C_6D_6$, 25° C., referenced to tetramethylsilane), the structure of the product was confirmed to be

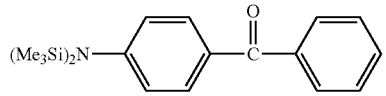

which corresponds to the structure from formula (II) above with each R and R' being a methyl group, $R^1$ being a phenylene group, and Q being represented by formula (II-a) with J being 0 and R being a phenyl group.

Example 3

BTMSGA

About 10.4 g epichlorohydrin and 112 mL 1.0 M THF solution of lithium bis(trimethylsilyl)amide were mixed in a flask connected to a reflux condenser. The mixture was heated to reflux for about one hour.

Solvent was removed from the reaction mixture by evaporation under vacuum at room temperature. The remaining reaction mixture was distilled under vacuum, yielding ~12.1 g (50% yield) of a colorless liquid.

From $^1$H NMR spectroscopy data (C$_6$D$_6$, 25° C., referenced to tetramethylsilane), the structure of the product was confirmed to be

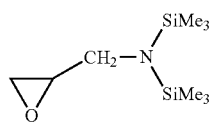

which corresponds to the structure from formula (II) above with each R and R' being a methyl group, R$^1$ being a methylene group, and Q being represented by formula (II-b) with J being O and each R being H.

Example 4

Synthesis of cis-1,4-polybutadiene (unmodified)

To a reactor equipped with turbine agitator blades were added 1.403 kg hexane and 3.083 kg of a 20.6% (by wt.) solution of 1,3-butadiene in hexane.

A preformed catalyst was prepared by mixing 7.35 mL of 4.32 M methylaluminoxane in toluene, 1.66 g of the foregoing butadiene solution, 0.59 mL of 0.537 M neodymium versatate in cyclohexane, 6.67 mL of 1.0 M diisobutylaluminum hydride in hexane, and 1.27 mL of 1.0 M diethylaluminum chloride in hexane. The catalyst was aged for ~15 minutes prior to being charged to the reactor.

The reactor jacket temperature was set to 65° C. and, ~53 minutes after catalyst addition, the polymerization mixture was cooled to room temperature. The resulting polymer cement was coagulated with 12 L isopropanol containing 5 g 2,6-di-tert-butyl-4-methylphenol and then drum dried.

Example 5

Synthesis of second cis-1,4-polybutadiene (unmodified)

The process of Example 4 was essentially repeated with the amounts of reactants and catalyst components employed being summarized in the following table.

TABLE 1

| Polymer | Amounts |
|---|---|
| hexane | 1.651 kg |
| 22.4% (by wt.) 1,3-butadiene in hexane | 2.835 kg |

TABLE 1-continued

| Catalyst | Amounts |
|---|---|
| 4.32 M methylaluminoxane in toluene | 6.10 mL |
| 22.4% (by wt.) 1,3-butadiene in hexane | 1.27 g |
| 0.537 M neodymium versatate in cyclohexane | 0.49 mL |
| 1.0 M diisobutylaluminum hydride in hexane | 5.53 mL |
| 1.0 M diethylaluminum chloride in hexane | 1.05 mL |

About 72 minutes after catalyst addition, the polymerization mixture was cooled to room temperature. The resulting polymer cement was coagulated and drum dried as in Example 4.

Properties of the control polymers from Examples 4 and 5 are compiled in Table 3 below.

Examples 6-9

Modified cis-1,4-polybutadienes

The process from Example 4 was essentially repeated. To the reactor was added 1.526 kg hexane and 2.940 kg of a 18.8% (by wt.) solution of 1,3-butadiene in hexane.

A preformed catalyst was prepared and aged as set forth in Example 4.

The reactor jacket temperature was set to 65° C. and, ~60 minutes after catalyst addition, the polymerization mixture was cooled to room temperature.

Portions of the polymer cement were transferred to four N$_2$-purged bottles and reacted with different functionalizing materials. Details are set forth in the following table.

TABLE 2

| | Amount of polymer cement | How functionalized |
|---|---|---|
| Example 6 | 423 g | 8.88 mL 0.200 M TTMSDAB (from Example 1) in cyclohexane |
| Example 7 (comparative) | 425 g | 6.07 mL 0.294 M 4,4'-bis(diethylamino)-benzophenone in toluene |
| Example 8 | 433 g | 6.06 mL 0.300 M BTMSAB (from Example 2) in cyclohexane |
| Example 9 (comparative) | 422 g | 5.06 mL 0.350 M 4-(diethylamino)-benzophenone in toluene |

Each bottle was tumbled for ~30 minutes in a water bath maintained at 65° C. The polymer in each bottle was coagulated with 3 L isopropanol containing 0.5 g 2,6-di-tert-butyl-4-methylphenol and then drum dried.

Properties of these functionalized polymers also are summarized below in Table 3.

Example 10

BTMSGA-modified cis-1,4-polybutadiene

The process from Example 4 was essentially repeated. To the reactor was added 1.512 kg hexane and 2.954 kg of a 21.5% (by wt.) solution of 1,3-butadiene in hexane.

A preformed catalyst was prepared and aged as set forth in Example 4.

The reactor jacket temperature was set to 65° C. and, ~55 minutes after catalyst addition, the polymerization mixture was cooled to room temperature.

A 435 g portion of the polymer cement was transferred to a $N_2$-purged bottle and reacted with 5.26 mL 0.463 M BTMSGA (from Example 3) in hexane. This bottle was treated in the same manner as those from Examples 6-9.

The properties of the polymers prepared in Examples 4-10 are set forth in tabular form below. Gum Mooney viscosity ($ML_{1+4}$) values were determined with a Monsanto™ Mooney viscometer (large rotor) using a one-minute warm-up time and a four-minute running time; molecular weights were determined by GPC using polystyrene standards; and 1,2-, c is 1,4-, and trans 1,4-linkage contents were determined from IR spectroscopic analysis.

TABLE 3

Properties of polymers from Examples 4-10

|  | 4 | 5 | 6 | 7 | 8 | 9 | 10 |
|---|---|---|---|---|---|---|---|
| $M_n$ (kg/mol) | 116.9 | 130.7 | 110.9 | 107.8 | 108.8 | 111.0 | 115.5 |
| $M_w/M_n$ | 1.86 | 1.99 | 1.83 | 1.87 | 1.85 | 1.84 | 1.93 |
| Gum $ML_{1+4}$ @ 100° C. | 29.4 | 44.2 | 21.6 | 21.8 | 20.9 | 21.9 | 41.7 |
| cis 1,4-linkage content (%) | 94.5 | 95.0 | 94.3 | 94.3 | 94.3 | 94.3 | 94.3 |
| trans 1,4-linkage content (%) | 5.0 | 4.5 | 5.2 | 5.2 | 5.2 | 5.2 | 5.2 |
| 1,2-linkage content (%) | 0.5 | 0.5 | 0.5 | 0.5 | 0.5 | 0.5 | 0.5 |

Examples 11-13

Synthesis of Styrene/Butadiene Copolymers

To a reactor equipped with turbine agitator blades were added 5.100 kg hexane, 1.278 kg styrene solution (33.0% by wt. in hexane), and 7.670 kg of a 22.0% (by wt.) solution of 1,3-butadiene in hexane. The reactor was charged with 11.98 mL n-butyllithium solution (1.6 M in hexane) and 3.95 mL of 2,2-bis(2'-tetrahydrofuryl)propane solution (1.6 M in hexane). The reactor jacket was heated and, once the batch temperature reached 50° C., the reactor jacket was cooled with cold water.

In a $N_2$-purged bottle, a 420 g portion of the polymer cement was quenched with 3 mL isopropanol containing 0.3 g 2,6-di-tert-butyl-4-methylphenol and then coagulated (~3 L isopropanol containing 0.5 g 2,6-di-tert-butyl-4-methylphenol) and drum dried. This is identified as Example 11 in the following table.

In another $N_2$-purged bottle, a 416 g portion of the polymer cement was reacted with ~5.1 mL 0.50 M BTMSGA (from Example 3) in hexane. The bottle was tumbled for ~30 minutes in a water bath maintained at 50° C. The resulting mixture was coagulated and drum dried as before. This is identified as Example 13 below.

Another unmodified SBR (identified as Example 12 below) was prepared. To a smaller reactor equipped with turbine agitator blades were added 1.597 kg hexane, 0.399 kg styrene solution (34.0% by wt. in hexane), and 2.440 kg of a 22.3% (by wt.) solution of 1,3-butadiene in hexane. The reactor was charged with 2.58 mL n-butyllithium solution (1.6 M in hexane) and 0.85 mL of 2,2-bis(2'-tetrahydrofuryl)propane solution (1.6 M in hexane). The reactor jacket was heated and, once the batch temperature reached 55° C., the reactor jacket was cooled with cold water. This polymer cement was removed from the reactor and coagulated in isopropanol containing 2,6-di-tert-butyl-4-methylphenol and drum dried.

TABLE 4

Properties of polymers from Examples 11-13

|  | 11 | 12 | 13 |
|---|---|---|---|
| $M_n$ (kg/mol) | 106.1 | 185.5 | 112.2 |
| $M_w/M_n$ | 1.03 | 1.05 | 1.16 |
| Gum $ML_{1+4}$ @ 100° C. | 8.7 | 49.5 | 15.2 |
| $T_g$ (° C.) | −32 | −31 | −32 |
| styrene content (%) | 21.2 | 20.0 | 21.2 |
| 1,2-linkage content (%) | 56.2 | 55.5 | 56.2 |

Examples 14-22

Preparation and Testing of Vulcanizates

Using the formulations set forth below, filled compounds were prepared from the polybutadienes from Examples 4-10 and the styrene/butadiene copolymers from Examples 11-13, with amounts being given in phr.

TABLE 5

Compositions for filled compounds

|  | cis-1,4-polydienes (Examples 14-20) | SBR (Examples 21-23) |
|---|---|---|
| synthesized polymer | 80 | 100 |
| polyisoprene | 20 | 0 |
| carbon black (N343 type) | 50 | 50 |
| oil (low PCA content) | 10 | 10 |
| wax | 2 | 2 |
| antioxidant | 1 | 0.95 |
| ZnO | 2.5 | 2.5 |
| stearic acid | 2 | 2 |
| accelerators | 1.3 | 1.3 |
| sulfur | 1.5 | 1.5 |
| Total | 170.3 | 170.25 |

Mooney viscosity ($ML_{1+4}$) values were determined at 130° C. for Examples 14-20 (polybutadienes) and 100° C. for Examples 21-23 (SBRs) with an Alpha Technologies™ Mooney viscometer (large rotor) using a 1-minute warm-up time and a 4-minute running time.

Vulcanizates made from each of the compounds were cured for ~15 minutes at 171° C. Tensile mechanical properties were determined using the procedure described in ASTM-D412. Payne effect (ΔG') and hysteresis (tan δ) data were obtained from a dynamic strain sweep experiment conducted according to the conditions set forth in Table 6.

TABLE 6

Strain sweep experiments

| | cis-1,4-polydienes (Examples 14-20) | SBR (Examples 21-23) |
|---|---|---|
| temperature (° C.) | 50 | 60 |
| frequency (Hz) | 1 | 10 |
| strain sweep | 0.1%-20% | 0.25%-15% |
| strain values for ΔG' | 0.1% and 20% | 0.25% and 14% |
| strain values for tan δ | 3% | 5% |

Physical properties of these vulcanizates are compiled below in Table 6 where $T_b$ is tensile strength at break and $E_b$ is percent elongation at break, respectively.

TABLE 7

Physical properties of compounds and vulcanizates

| Polymer (Ex. no.) | Compound | $ML_{1+4}$ | $T_b$ @ 23° C. (MPa) | $E_b$ @ 23° C. (%) | ΔG' (MPa) | tan δ |
|---|---|---|---|---|---|---|
| 14 | 4 | 54.6 | 12.3 | 424 | 2.99 | 0.135 |
| 15 | 5 | 67.2 | 13.1 | 435 | 2.56 | 0.124 |
| 16 | 6 | 65.6 | 11.5 | 336 | 1.78 | 0.100 |
| 17 | 7 | 57.8 | 12.6 | 373 | 2.11 | 0.118 |
| 18 | 8 | 58.2 | 12.8 | 380 | 2.33 | 0.121 |
| 19 | 9 | 53.6 | 14.2 | 410 | 3.00 | 0.137 |
| 20 | 10 | 68.6 | 13.4 | 350 | 2.11 | 0.101 |
| 21 | 11 | 31.7 | 15.5 | 474 | 4.03 | 0.249 |
| 22 | 12 | 89.1 | 17.6 | 529 | 1.75 | 0.157 |
| 23 | 13 | 56.3 | 18.3 | 468 | 0.72 | 0.131 |

The data from Table 7 show, inter alia, that vulcanizates made from compounds employing cis-1,4-polybutadienes functionalized with disilylamino group-containing compounds (Examples 16, 18 and 20) provide, compared to those made with unmodified cis-1,4-polybutadienes, reductions in tan δ at 50° C. (indicative of reduced hysteresis) and ΔG' (indicative of reductions in Payne effect due to enhanced interaction between the polymer and carbon black filler). Examples 17 and 19 (comparatives) were made with polymers functionalized with dialkylamino group-containing compounds, one of which (Example 19) showed no reduction in hysteresis and Payne effect relative to vulcanizates made with unmodified polymers while the other (Example 17) showed reduced hysteresis and reduced Payne effect relative but to a less degree than was achieved with the corresponding disilylamino analog (Example 16).

With respect to the SBR interpolymers, a vulcanizate made from a compound employing a BTMSGA-modified SBR (Example 23) exhibited a lower tan δ at 60° C. (indicating reduced hysteresis) and a lower ΔG' (indicating reduced Payne effect due to stronger interactivity between the SBR and carbon black filler particles) than a vulcanizate made from compounds employing non-functionalized SBR control polymers (Examples 21-22).

That which is claimed is:

1. A method for providing a functionalized polymer, said method comprising reacting a terminally active polymer that comprises diene mer with a compound that comprises a disilylamino group and a group capable of reacting with terminally active polymers, said group being selected from (thio) keto, epoxy and epithio.

2. The method of claim 1 wherein said group capable of reacting with terminally active polymers is a keto group.

3. The method of claim 2 wherein said compound further comprises at least two aromatic groups, each of said aromatic groups optionally comprising at least one nitrogen atom directly bonded to an aromatic ring C atom.

4. The method of claim 1 wherein each Si atom of said disilylamino group is bonded to a $C_1$-$C_6$ alkyl group.

5. The method of claim 1 wherein said compound comprises more than one disilylamino group.

6. The method of claim 5 wherein the N atom of each of said more than one disilylamino groups is directly bonded to an aromatic ring C atom.

7. The method of claim 1 wherein said polymer has a cis-1,4-linkage content of at least about 95%.

8. The method of claim 1 wherein said reaction is performed in a solvent system that comprises a liquid aliphatic hydrocarbon.

9. A polymer comprising a terminal moiety that comprises a disilylamino group and the residue of a group comprising a heteroatom, said terminal moiety having the general formula

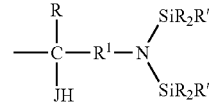

where each R independently is a hydrogen atom or a substituted or unsubstituted monovalent organic group; J is an O or S atom; and each R' independently is R or both R' groups together form a substituted or unsubstituted divalent organic group which, together with the two Si atoms and N atom of the disilylamino group, form a cyclic functionality.

10. The polymer of claim 9 wherein the R group attached to the C atom is a methyl group.

11. The polymer of claim 10 wherein $R^1$ is a $C_1$-$C_6$ alkylene group.

12. The polymer of claim 9 wherein the R group attached to the C atom is a substituted phenyl group.

13. The polymer of claim 12 wherein $R^1$ is a phenylene group.

14. The polymer of claim 9 where R' is R, and each R attached to each Si atom independently is a $C_1$-$C_6$ alkyl group.

15. The polymer of claim 9 wherein said polymer has a cis-1,4-linkage content of at least about 95%.

16. A vulcanizate comprising at least one type of particulate filler and the polymer of claim 9.

17. An article comprising the vulcanizate of claim 16.

* * * * *